(No Model.)
C. HOLLINGSWORTH.
FEED TROUGH.
No. 385,756. Patented July 10, 1888.
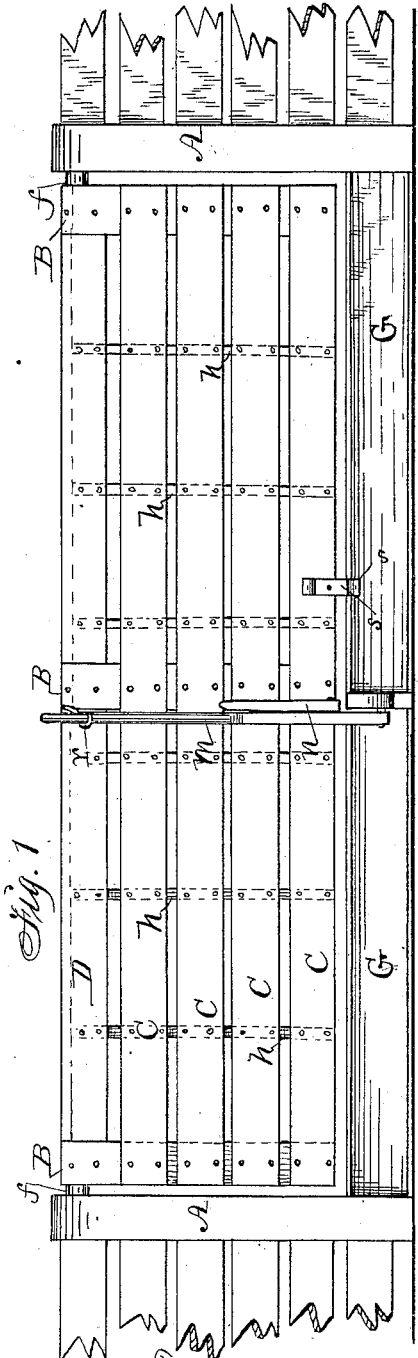
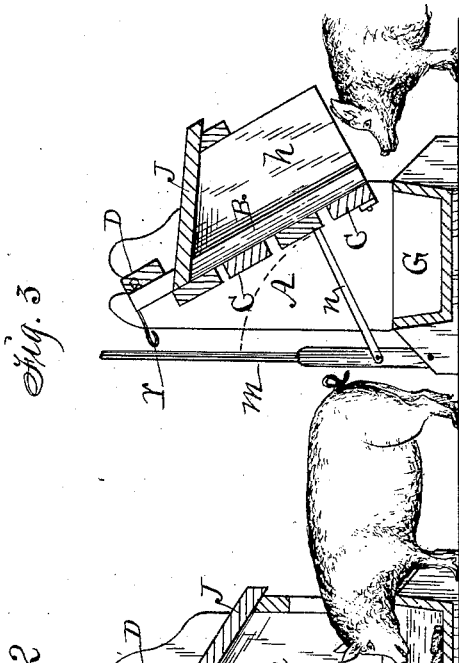
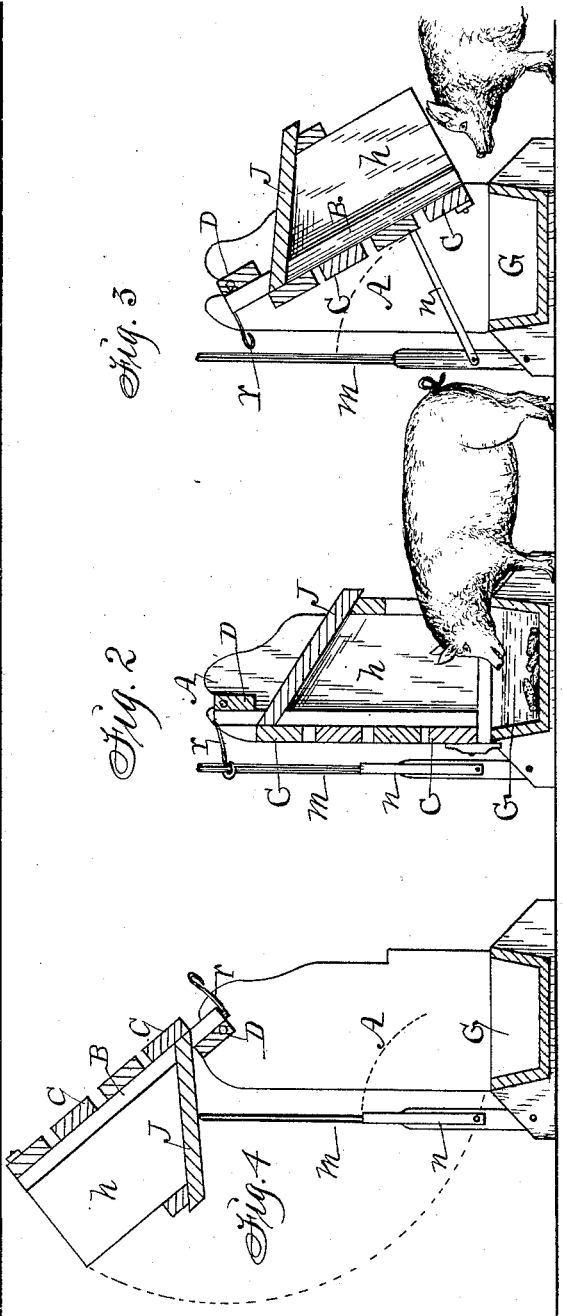
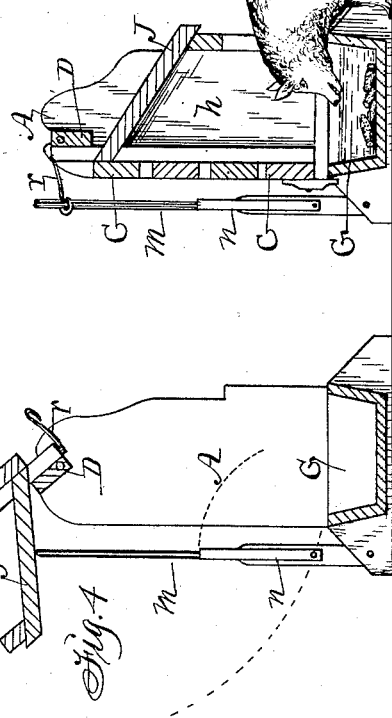
Witnesses:
M. P. Smith.
A. L. Smith.
Inventor:
Coleman Hollingsworth,
By Thomas G. Orwig, Atty.

United States Patent Office.

COLEMAN HOLLINGSWORTH, OF WIRT, IOWA.

FEED-TROUGH.

SPECIFICATION forming part of Letters Patent No. 385,756, dated July 10, 1888.

Application filed April 2, 1888. Serial No. 269,388. (No model.)

*To all whom it may concern:*

Be it known that I, COLEMAN HOLLINGSWORTH, a citizen of the United States of America, and a resident of Wirt, in the county of Ringgold and State of Iowa, have invented a Feed-Trough, Fence-Panel, and Gate combined, of which the following is a specification.

My object is to save expense in the construction of a wall or fence and a trough adapted for restraining and feeding hogs, calves, and sheep, and to lessen and facilitate the labor of taking care of such animals, and also to prevent the animals from fouling and wasting feed.

My invention consists in the construction and combination of a trough and fence-panel with a frame or fixed posts, as hereinafter set forth, pointed out in my claims, and illustrated in the accompanying drawings, in which—

Figure 1 is a view showing the rear and closed side of the trough and panel combined with a fence. Fig. 2 is a vertical transverse sectional view through Fig. 1, showing a hog feeding from the trough. Fig. 3 is a sectional view showing the trough in position, as required, to prevent animals from getting access to the trough while feed is being placed into the trough. Fig. 4 is a sectional view showing the trough in position as required to serve as a gate for allowing animals to pass from one side of the trough and an inclosure to the other.

A A represent fixed fence-posts or the uprights of a portable or fixed frame.

B are the uprights, and C the rails, of a movable panel.

D is a board or rail fixed to the top and inside of the uprights B.

*f* are journals formed on or fixed to the ends of the rail D or the top corners of the panel, and adapted to enter slots or bearings formed in or fixed to the top ends of the uprights A in such a manner that the panel will be thereby detachably suspended and hinged to said uprights.

G is an open-topped trough fixed to the bottom of the uprights A.

*h h* are partitions fixed to the panel in such a manner that they will, when immediately over the trough, as shown in Fig. 2, prevent animals from getting their heads together or crowding each other while feeding from the trough.

J is a board fixed on the inclined top edges of the partitions *h* to aid in securing the partitions firmly, and also to serve as a roof for the trough.

*m* is a prop, pivoted to the base of the trough, that will retain the panel elevated, as shown in Fig. 4, and, as required, to let animals pass over the trough.

*n* is a prop pivoted to the lower end of the prop *m* in such a manner that it will retain the panel in an inclined position relative to the trough as required to keep animals from the trough while feed is being placed in the trough.

*r* is a ring or clasp, connected with the top and center of the panel in such a manner that it will engage the top of the prop *m* to aid in locking the panel and trough together.

*s* is a turn-button pivoted to the bottom portion of the panel to engage the trough and to aid in locking the panel securely to the trough while animals are feeding from the trough.

I claim as my invention—

1. A feed-trough having posts at its ends, a gate or panel having fixed partitions projecting at right angles, and a roof fixed on top of the partitions, a prop pivoted to the base of the trough and carrying a minor prop, and a fastening device fixed to the top of the panel to engage the top end of the pivoted post, arranged and combined to be adjusted in the manner set forth, for the purposes stated.

2. The gate or panel B C, having journals *f*, the trough G, the partitions *h*, and roof J, fixed to the panel, the props *m* and *n*, and the fastening device *r*, and fixed posts at the ends of the panel, constructed and combined substantially as shown and described, for the purposes stated.

COLEMAN HOLLINGSWORTH.

Witnesses:
N. J. KENT,
A. W. CORNWALL.